US011338656B2

(12) United States Patent
An et al.

(10) Patent No.: US 11,338,656 B2
(45) Date of Patent: May 24, 2022

(54) DEVICE FOR ENHANCING RIGIDITY OF VEHICLE BODY

(71) Applicants: Hyundai Motor Company, Seoul (KR); Kia Motors Corporation, Seoul (KR)

(72) Inventors: Byeong Do An, Anyang-si (KR); Yong Dok An, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 10 days.

(21) Appl. No.: 17/015,624

(22) Filed: Sep. 9, 2020

(65) Prior Publication Data

US 2021/0309082 A1     Oct. 7, 2021

(30) Foreign Application Priority Data

Apr. 6, 2020   (KR) .................. 10-2020-0041429

(51) Int. Cl.
*B60J 5/04*      (2006.01)
*B62D 29/04*     (2006.01)
*B62D 25/04*     (2006.01)

(52) U.S. Cl.
CPC ........... *B60J 5/0455* (2013.01); *B60J 5/0458* (2013.01); *B62D 25/04* (2013.01); *B62D 29/041* (2013.01)

(58) Field of Classification Search
CPC .............................. B60J 5/0455; B60J 5/0458
USPC ....................................................... 296/202
See application file for complete search history.

(56) References Cited

U.S. PATENT DOCUMENTS

| | | | | |
|---|---|---|---|---|
| 1,594,157 A * | 7/1926 | Edgar | ...................... | E05F 5/025 16/86 B |
| 1,947,524 A * | 2/1934 | Horldt | ...................... | E05F 7/04 16/85 |
| 2,596,780 A * | 5/1952 | Meyers | ..................... | B60G 7/04 267/140 |
| 4,940,282 A * | 7/1990 | Townsend | .................. | B60J 5/06 296/204 |
| 5,224,752 A * | 7/1993 | Marshall | ................ | B60J 5/0426 292/144 |
| 5,626,384 A * | 5/1997 | Walther | ...................... | B60J 5/06 296/146.1 |
| 5,791,723 A * | 8/1998 | Bell | ........................... | B60J 5/06 16/86 B |
| 5,964,487 A * | 10/1999 | Shamblin | .............. | E05B 47/026 292/144 |
| 6,206,455 B1 * | 3/2001 | Faubert | ...................... | B60J 5/06 16/86 B |
| 6,601,910 B1 * | 8/2003 | Duggan | ................. | B60J 5/0426 296/146.6 |
| 7,735,901 B2 * | 6/2010 | Melz | ...................... | B62D 25/04 296/146.6 |

(Continued)

FOREIGN PATENT DOCUMENTS

KR        20030093642 A     12/2003

*Primary Examiner* — Dennis H Pedder
(74) *Attorney, Agent, or Firm* — Slater Matsil, LLP

(57) ABSTRACT

A device for enhancing rigidity includes a pin holder configured to be provided at a door opening of a vehicle body or at a door provided at the door opening, and a rigid pin having a shape corresponding to the pin holder, the rigid pin configured to be provided at the door or at the door opening of the vehicle body and configured to be press-fitted into the pin holder when the door is closed at the door opening.

20 Claims, 16 Drawing Sheets

(56) References Cited

U.S. PATENT DOCUMENTS

2003/0006625 A1\* 1/2003 Moriyama ............ B60J 5/0431
296/146.6

\* cited by examiner

DEVICE FOR ENHANCING RIGIDITY OF VEHICLE BODY

CROSS-REFERENCE TO RELATED APPLICATIONS

The present application claims the benefit of Korean Patent Application No. 10-2020-0041429, filed on Apr. 6, 2020, which application is hereby incorporated herein by reference.

TECHNICAL FIELD

The present disclosure relates to a device for enhancing rigidity of a vehicle body.

BACKGROUND

During traveling of a vehicle, particularly at the time of cornering, torsion occurs in the entire vehicle body. In particular, an opening portion for a door is most vulnerable to the torsion of the vehicle body.

However, a door is just recognized as a part mounted on a vehicle body, and thus development of a technology related to rigidity of a vehicle body has not been properly conducted.

However, since the opening portion for the door is necessary for a vehicle body, a method for improving rigidity of a vehicle body by utilizing a door part has been demanded.

The matters described as the related art have been provided only for assisting in the understanding for the background of the present disclosure and should not be considered as corresponding to the related art known to those skilled in the art.

SUMMARY

The present disclosure relates to a device for enhancing rigidity of a vehicle body. Particular embodiments relate to a device for enhancing rigidity of a vehicle body, in which the device reinforces connection between the vehicle body and a door by using a matching structure between a pin and a holder to suppress torsion at an opening portion for the door.

According to an embodiment of the present disclosure, a device for enhancing rigidity of a vehicle body includes a pin holder provided at a portion of the vehicle body closed with a door, or at the door, and a rigid pin having a shape corresponding to the pin holder, provided at the door or the portion of the vehicle body closed with the door, and press-fitted into the pin holder in a process in which the door is closed to the vehicle body.

The pin holder may be mounted at a lower portion of a center pillar of the vehicle body.

The device may further include a buffer member provided at a contact portion between the pin holder and the rigid pin to absorb an impact.

A head portion formed at one end of the rigid pin may protrude toward the pin holder, and the buffer member may be formed to enclose the head portion and be coupled to the rigid pin.

A flange portion may be formed at a middle portion of the rigid pin, a locking groove may be formed along a circumferential direction of an outer circumferential surface of one end of the head portion that is adjacent to the flange portion, and a locking protrusion having a shape corresponding to the locking groove may be formed along a circumferential direction of an inner circumferential surface of one end of the buffer member, and be coupled to the locking groove.

A first fitting portion having a cone shape may be formed at the other end of the buffer member, and a second fitting portion having a groove shape corresponding to the first fitting portion may be formed at a middle portion of the pin holder.

An angle of a side surface of the first fitting portion may be 25° to 35° with respect to an axis of the rigid pin.

A maximum outer diameter of the buffer member may be 20 mm to 24 mm around the axis of the rigid pin.

The other end of the head portion of the rigid pin may have a shape corresponding to the cone shape of the first fitting portion, and a thickness of the side surface of the first fitting portion may be 3 mm to 5 mm.

The buffer member may be formed of a thermoplastic elastomer (TPE) having a hardness of 70 Hs to 80 Hs.

A position of the buffer member in an axial direction may be adjusted so that a pressed length of the side surface of the first fitting portion that is pressed against an inner wall surface of the groove of the second fitting portion in a state in which the buffer member is fitted into the pin holder is 0.5 mm to 1.5 mm.

A gap having a predetermined size may be formed between a distal end of the first fitting portion and an inner distal end of the second fitting portion that faces the distal end of the first fitting portion, in a state in which the buffer member is fitted into the pin holder.

A pin stiffener may be assembled to a back surface of a door inner panel included in the door, and the rigid pin may be assembled while penetrating through a pin mounting hole formed in the pin stiffener at a front surface of the door inner panel.

A washer may be inserted onto a body portion formed at the other end of the rigid pin so as to be interposed between a flange portion formed at a middle portion of the rigid pin and the front surface of the door inner panel, and the body portion may penetrate through the pin mounting hole and be engaged by a fixing nut at a back surface of the pin stiffener.

The pin stiffener may have a plate shape and be in close surface-contact with the back surface of the door inner panel, one end of the pin stiffener may be bonded to a lower protruding surface formed at the back surface of the door inner panel, and the other end of the pin stiffener may be bonded to a side protruding surface formed at the back surface of the door inner panel.

The pin stiffener may have a plate shape and be in close surface-contact with the back surface of the door inner panel, and one end of the pin stiffener may be bonded to a lower protruding surface formed at the back surface of the door inner panel.

The pin stiffener may have a circular plate shape and be in close surface-contact with the back surface of the door inner panel, and a part of an edge of the pin stiffener may be bonded to a corner protruding surface where a side protruding surface and a lower protruding surface meet each other at the back surface of the door inner panel.

The pin stiffener may have a plate shape having a thickness of 1 mm to 1.4 mm.

A holder stiffener may be assembled to a back surface of a side outer panel included in the vehicle body, and the pin holder may be assembled while penetrating through a holder mounting hole formed in the holder stiffener at a front surface of the side outer panel.

A second fitting portion into which the rigid pin is fitted may be formed at the center of the pin holder, an edge portion surrounding the second fitting portion may have a plate shape and be in close surface-contact with the front surface of the side outer panel, and the pin holder may be bolted to the side outer panel and the holder stiffener by bolting structures at the edge portion of the pin holder.

The edge portion of the pin holder may have a rhombus shape with diagonals having different lengths and the pin holder may be bolted at opposite vertices connected by a diagonal having a longer length.

The edge portion of the pin holder may have a regular triangle shape or a square shape and the pin holder may be bolted at each vertex.

The edge portion of the pin holder may have a plate shape having a thickness of 1.2 mm to 2 mm.

The holder stiffener may have a rectangular plate shape and is in close surface-contact with the back surface of the side outer panel, and the holder stiffener may be bolted to the side outer panel by the bolting structures at an edge portion of the holder stiffener.

The holder stiffener may have a plate shape having a thickness of 1 mm to 1.4 mm.

The pin holder may be mounted at a middle portion of a front pillar of the vehicle body or an upper portion of the center pillar.

An axial direction of the rigid pin may be a tangential direction with respect to a radius of rotation of the door.

According to another embodiment of the present disclosure, a device for enhancing rigidity of a vehicle body includes a rigid pin provided at a portion of the vehicle body closed with a door, and a pin holder into which the rigid pin is press-fitted in a state in which the door is closed to the vehicle body.

DETAILED DESCRIPTION OF ILLUSTRATIVE EMBODIMENTS

Exemplary embodiments of the present disclosure will be described in detail with reference to the accompanying drawings.

Figure 1:
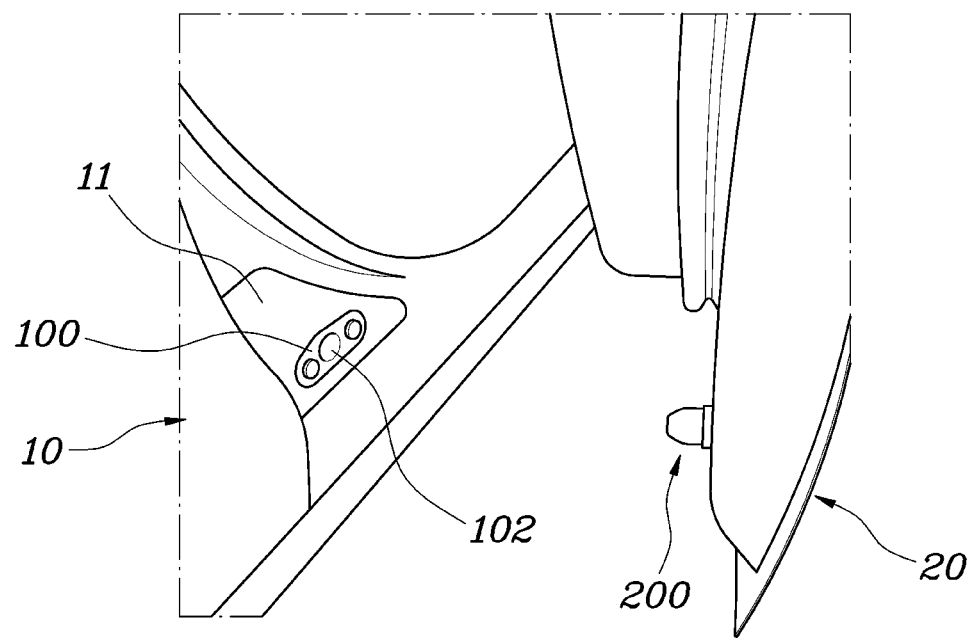
FIG. 1 is a view illustrating a state in which a rigid pin and a pin holder according to embodiments of the present disclosure are mounted on a door and a vehicle body, respectively.

FIG. 1 is a view illustrating a state in which a rigid pin 200 and a pin holder 100 according to embodiments of the present disclosure are mounted on a door 20 and a vehicle body 10, respectively. The pin holder 100 is mounted on the vehicle body 10, and the rigid pin 200 is mounted on the door 20 to reinforce connection between the door 20 and the vehicle body 10.

As another example, positions of the pin holder 100 and the rigid pin 200 may be reversed. The rigid pin 200 may be mounted on the vehicle body 10, and the pin holder 100 may be mounted on the door 20 to reinforce connection between the door 20 and the vehicle body 10.

Specifically, referring to FIG. 1, the pin holder 100 is mounted at a portion of the vehicle body 10 closed with the door 20, that is, at an opening portion for the door 20 so as to face the rigid pin 200.

Further, the rigid pin 200 has a shape corresponding to the pin holder 100, is mounted on the door 20, and is press-fitted into the pin holder 100 in a state in which the door 20 is closed to the vehicle body 10.

Figure 2:
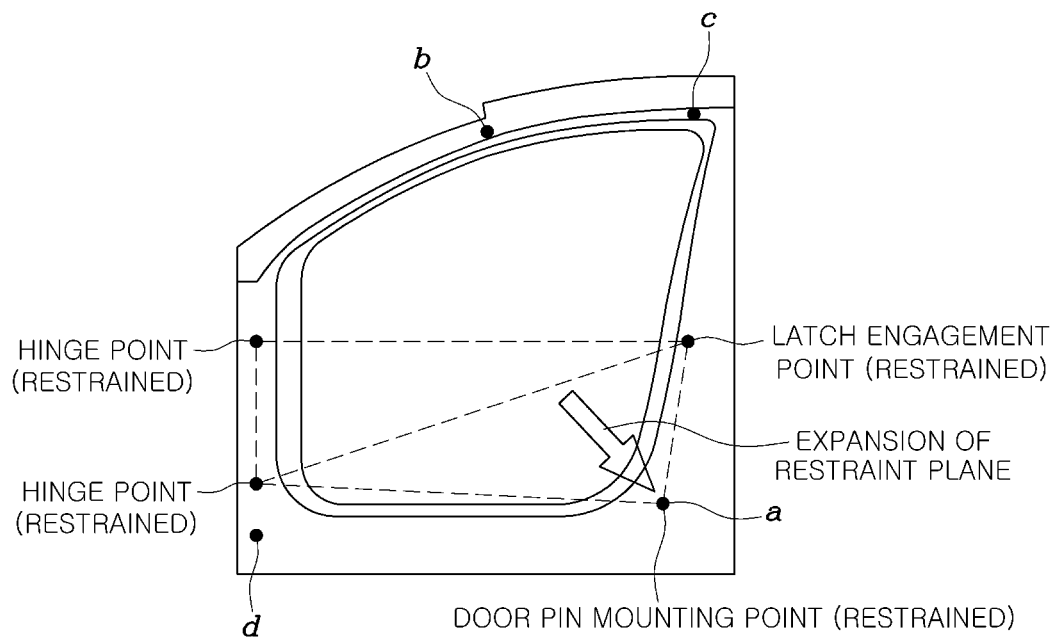
FIG. 2 is a view illustrating positions at which pin holders according to embodiments of the present disclosure may be mounted.

That is, as illustrated in FIG. 2, in the door 20 of a vehicle, hinge points that serve as a rotational axis of the door 20 are provided at an upper-front portion and a lower-front portion, respectively, to connect and restrain the door 20 and the vehicle body 10 to each other, and a point at which the door 20 is engaged with the vehicle body 10 by a latch is provided at a portion where a middle portion of a center pillar and a rear portion of the door 20 meet each other to connect and restrain the door 20 and the vehicle body 10 to each other when the door 20 is closed. As a result, the door 20 and the vehicle body 10 are connected by a three-point support structure.

In addition, according to embodiments of the present disclosure, the rigid pin 200 mounted on the door 20 is press-fitted into the pin holder 100 mounted on the vehicle body 10 when the door 20 is closed, such that the door 20 and the vehicle body 10 are connected by a four-point support structure.

Accordingly, as the door 20 and the vehicle body 10 are additionally connected to reinforce the connection, a risk of deformation of the opening portion for the door 20 during traveling of the vehicle is suppressed, such that rigidity of the vehicle body 10 is enhanced, thereby improving ride and handling (R&H) performance.

Further, as generation of vibration of a door panel during traveling of the vehicle is suppressed, road noise is reduced and durability of a hinge and latch structure is improved.

In addition, as support points between the door 20 and the vehicle body 10 are added, side crashworthiness at the time of collision of the vehicle is improved.

Further, preferably, the pin holder 100 may be mounted at a lower portion of the center pillar of the vehicle body 10.

That is, in a case where the pin holder 100 is mounted at a lower side point a of the center pillar as illustrated in FIG. 2, the four-point support structure is implemented to form a rectangular restraint plane, in which the restraint plane is two times or more as large as a restraint plane of the three-point support structure including two hinge points and one latch engagement point, such that it is possible to more effectively reinforce the connection between the door 20 and the vehicle body 10.

However, in some cases, the pin holder 100 may be mounted at a middle point b of a front pillar of the vehicle body 10, may be mounted at an upper side point c of the center pillar, or may be mounted at a vehicle body point d positioned below the hinge point of the opening portion for the door 20. For reference, the pin holder 100 may be mounted at one or all of the points.

As such, in all the cases of the points b, c, and d, the restraint plane is larger than the restraint plane implemented by the three-point support structure. Therefore, the connection between the door 20 and vehicle body 10 is reinforced, thereby making it possible to improve rigidity of the vehicle body 10.

Figure 4:
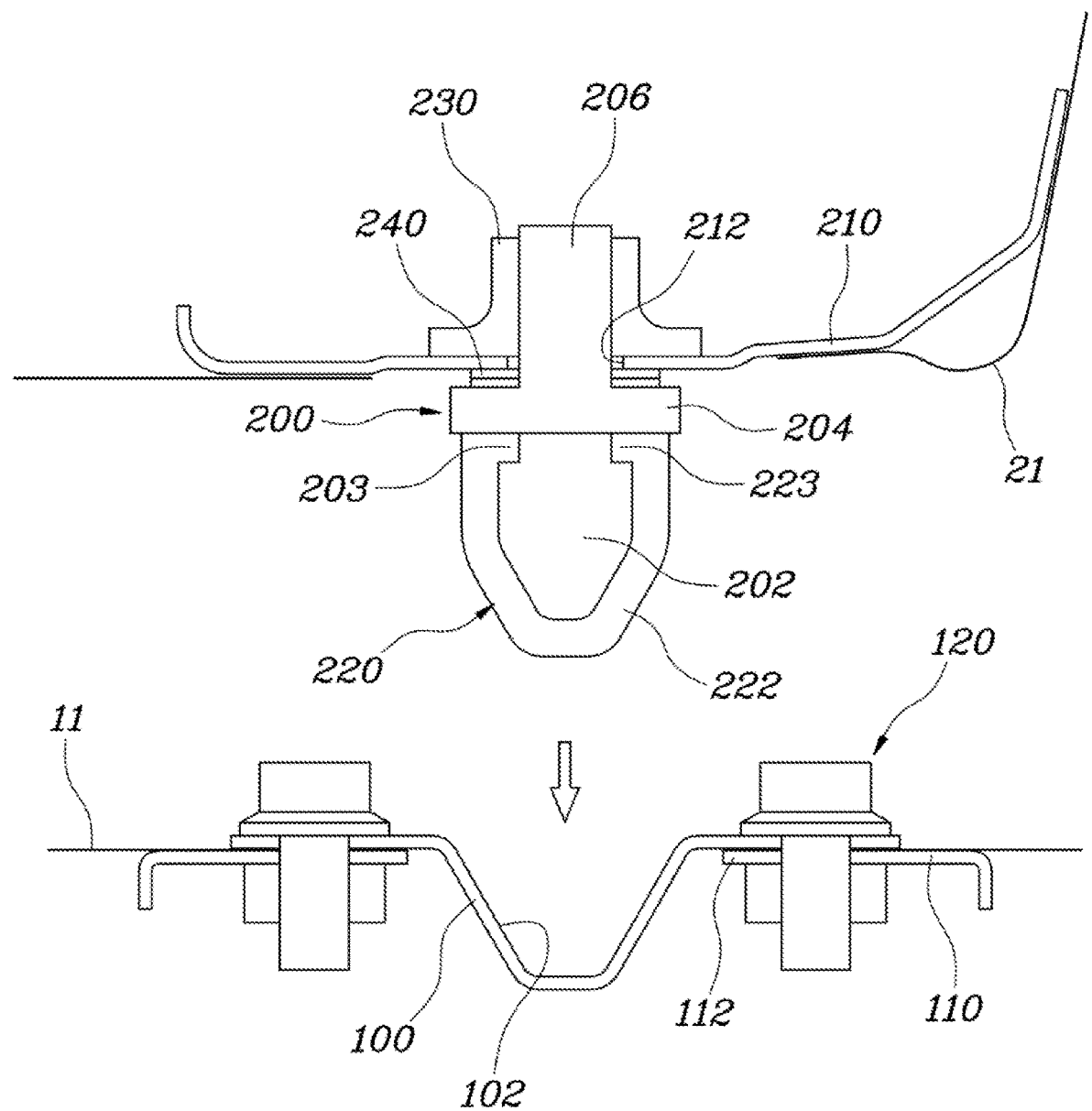
FIG. 4 is a cross-sectional view illustrating a state in which the rigid pin and the pin holder according to embodiments of the present disclosure are mounted.

Meanwhile, referring to FIG. 4, according to embodiments of the present disclosure, a buffer member 220 may be further provided at a contact portion between the pin holder wo and the rigid pin 200.

The buffer member 220 may be formed of an elastic material, preferably, a thermoplastic elastomer (TPE). Therefore, it is possible to absorb an impact generated in a process in which the rigid pin 200 is fitted into the pin holder wo, absorb a tolerance spread, and improve opening and closing convenience.

The buffer member 220 may be coupled to the rigid pin 200 or the pin holder 100. In an embodiment of the present disclosure, an example in which the buffer member 220 is coupled to the rigid pin 200 is described.

Referring to FIG. 4, a head portion 202 formed at one end of the rigid pin 200 protrudes toward the pin holder 100, and the buffer member 220 is formed to enclose the head portion 202 and is coupled to the rigid pin 200.

That is, the buffer member 220 completely encloses the head portion 202 of the rigid pin 200, and an outer surface of the buffer member 220 is press-fitted into an inner surface of the pin holder 100.

A structure in which the buffer member 220 is coupled to the head portion 202 is described in detail as follows. A flange portion 204 having a hexagonal edge is formed at a middle portion of the rigid pin 200, and a locking groove 203 is formed along a circumferential direction of an outer circumferential surface of one end of the head portion 202 that is adjacent to the flange portion 204.

Further, a locking protrusion 223 having a ring shape corresponding to the locking groove 203 is formed along a circumferential direction of an inner circumferential surface of one end of the buffer member 220, and is coupled to the locking groove 203.

That is, one end of the buffer member 220 is formed in a cylindrical shape, a central portion of the one end on an axis is opened, and the locking protrusion 223 protrudes along an inner circumferential surface of an edge of the opened central portion.

Therefore, in a case where the head portion 202 of the rigid pin 200 is inserted so as to reach the innermost portion of the opened buffer member 220, the locking protrusion 223 is fitted into the locking groove 203, and an outer surface of the locking protrusion 223 is supported by one surface of the flange portion 204, such that the buffer member 220 is coupled while enclosing the entire head portion 202.

Meanwhile, as illustrated in FIG. 4, a cone-shaped first fitting portion 222 formed so that a pointed portion faces the pin holder 100 is formed at the other end of the buffer member 220, and a groove-shaped second fitting portion 102 corresponding to the first fitting portion 222 is formed at a middle portion of the pin holder 100.

Here, the second fitting portion 102 is recessed toward the inside of the vehicle body 10, and a groove shape of the recessed portion corresponds to the cone shape of the first fitting portion 222.

Accordingly, when the door 20 is closed, an outer surface of the cone-shaped first fitting portion 222 is supported to an inner surface of the groove of the second fitting portion 102 while being in close contact with the inner surface, such that the rigid pin 200 is stably inserted into the pin holder 100 and effectiveness of absorption of an impact generated due to collision between the rigid pin 200 and the pin holder 100 is improved.

Figure 5:
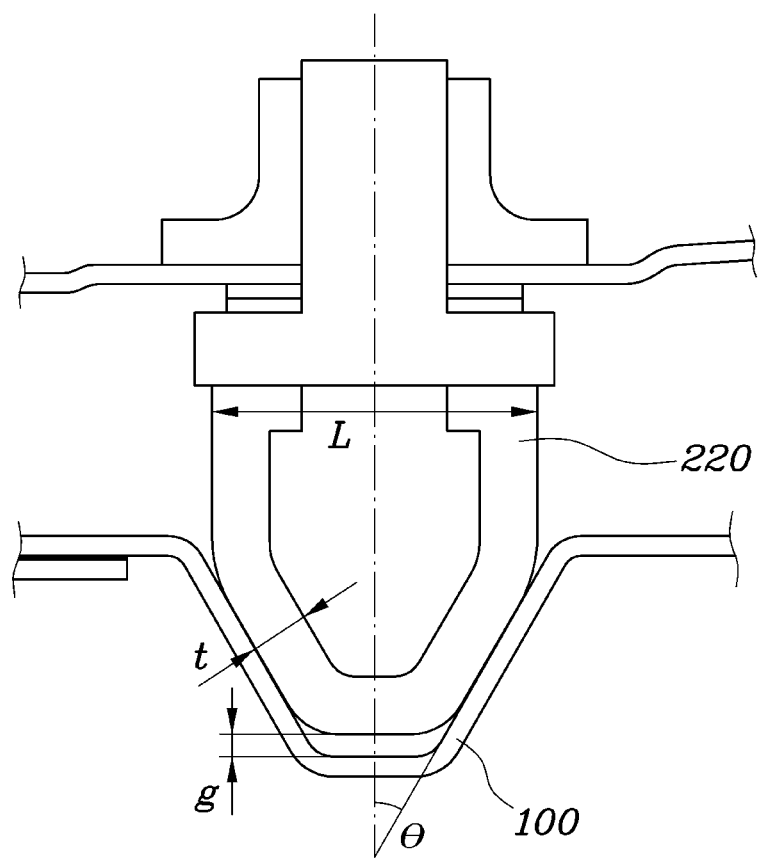
FIG. 5 is a view illustrating a design factor of a buffer member, and a gap between the buffer member and the pin holder according to embodiments of the present disclosure.

Further, as illustrated in FIG. 5, according to embodiments of the present disclosure, an angle θ of a side surface of the first fitting portion 222 of the buffer member 220 may be 25° to 35° with respect to an axis of the rigid pin 200.

Figure 17:
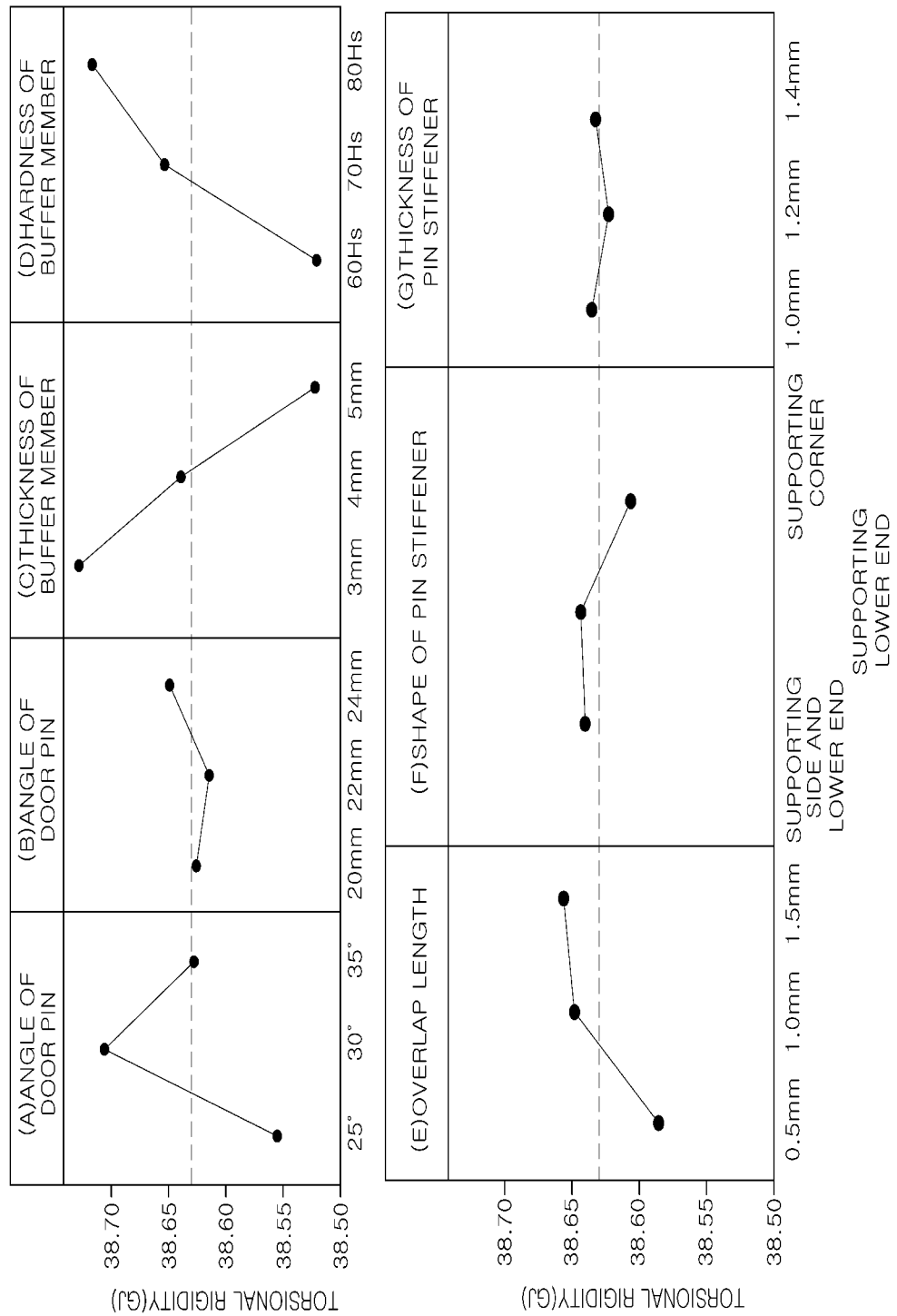
FIGS. 17 and 18 are diagrams illustrating results of analyzing torsional rigidity for each design factor of a device for enhancing rigidity according to embodiments of the present disclosure.

Referring to (A) in FIG. 17, it may be appreciated that the angle θ of the side surface of the first fitting portion 222 is preferably 30°, which is most advantageous in increasing the torsional rigidity of the vehicle body 10.

Further, as illustrated in FIG. 5, according to embodiments of the present disclosure, a maximum outer diameter L of the buffer member 220 may be 20 mm to 24 mm around the axis of the rigid pin 200.

Referring to (B) in FIG. 17, it may be appreciated that the maximum outer diameter L of the buffer member 220 is preferably 24 mm, which is most advantageous in increasing the torsional rigidity of the vehicle body 10.

Further, according to embodiments of the present disclosure, the other end of the head portion 202 of the rigid pin 200 may have a shape corresponding to the cone shape of the first fitting portion 222.

That is, an outer circumferential surface of the other end of the head portion 202 of the rigid pin 200 may have a cone shape of which only a size is different from that of the cone shape of the first fitting portion 222.

Therefore, as illustrated in FIG. 5, a thickness t of the side surface of the first fitting portion 222 may be uniform, and may be 3 mm to 5 mm.

Referring to (C) in FIG. 17, it may be appreciated that the thickness t of the side surface of the first fitting portion 222 is preferably 3 mm, which is most advantageous in increasing the torsional rigidity of the vehicle body 10.

Further, according to embodiments of the present disclosure, the buffer member 220 may be formed of an olefin-based TPE having a hardness of 60 Hs to 80 Hs, which has excellent mechanical physical property, wear resistance, and environmental resistance.

Referring to (D) in FIG. 17, it may be appreciated that the hardness of the buffer member 220 is preferably 80 Hs, which is most advantageous in increasing the torsional rigidity of the vehicle body 10.

Further, according to embodiments of the present disclosure, a position of the buffer member 220 in an axial direction may be adjusted so that a pressed length (overlap length) of the side surface of the first fitting portion 222 that is pressed against an inner wall surface of the groove of the second fitting portion 102 in a state in which the buffer member 220 is fitted into the pin holder 100 is 0.5 mm to 1.5 mm.

For example, since a position of the rigid pin 200 in the axial direction is changed depending on a thickness or the number of washers 240 interposed between the rigid pin 200 and a pin stiffener 210 to be described later, the position of the rigid pin 200 on the axis may be determined by adjusting the thickness or the number of washers 240, and the pressed length of the side surface of the first fitting portion 222 may be changed depending on the position of the rigid pin 200.

Referring to (E) in FIG. 17, it may be appreciated that the pressed length (overlap length) of the side surface of the first fitting portion 222 is preferably 1.5 mm, which is most advantageous in increasing the torsional rigidity of the vehicle body 10.

Further, as illustrated in FIG. 5, according to embodiments of the present disclosure, a gap having a predetermined size may be formed between a distal end of the first fitting portion 222 and an inner distal end of the second fitting portion 102 that faces the distal end of the first fitting portion 222, in a state in which the buffer member 220 is fitted into the pin holder 100.

For example, the size of the gap is preferably about 2 mm. In this case, it is possible to prevent a phenomenon that the door 20 is not closed due to an elastic repulsive force of the buffer member 220 when the door 20 is closed.

Meanwhile, the rigid pin 200 according to embodiments of the present disclosure may be assembled to the door 20 by using the pin stiffener 210.

Figure 3:
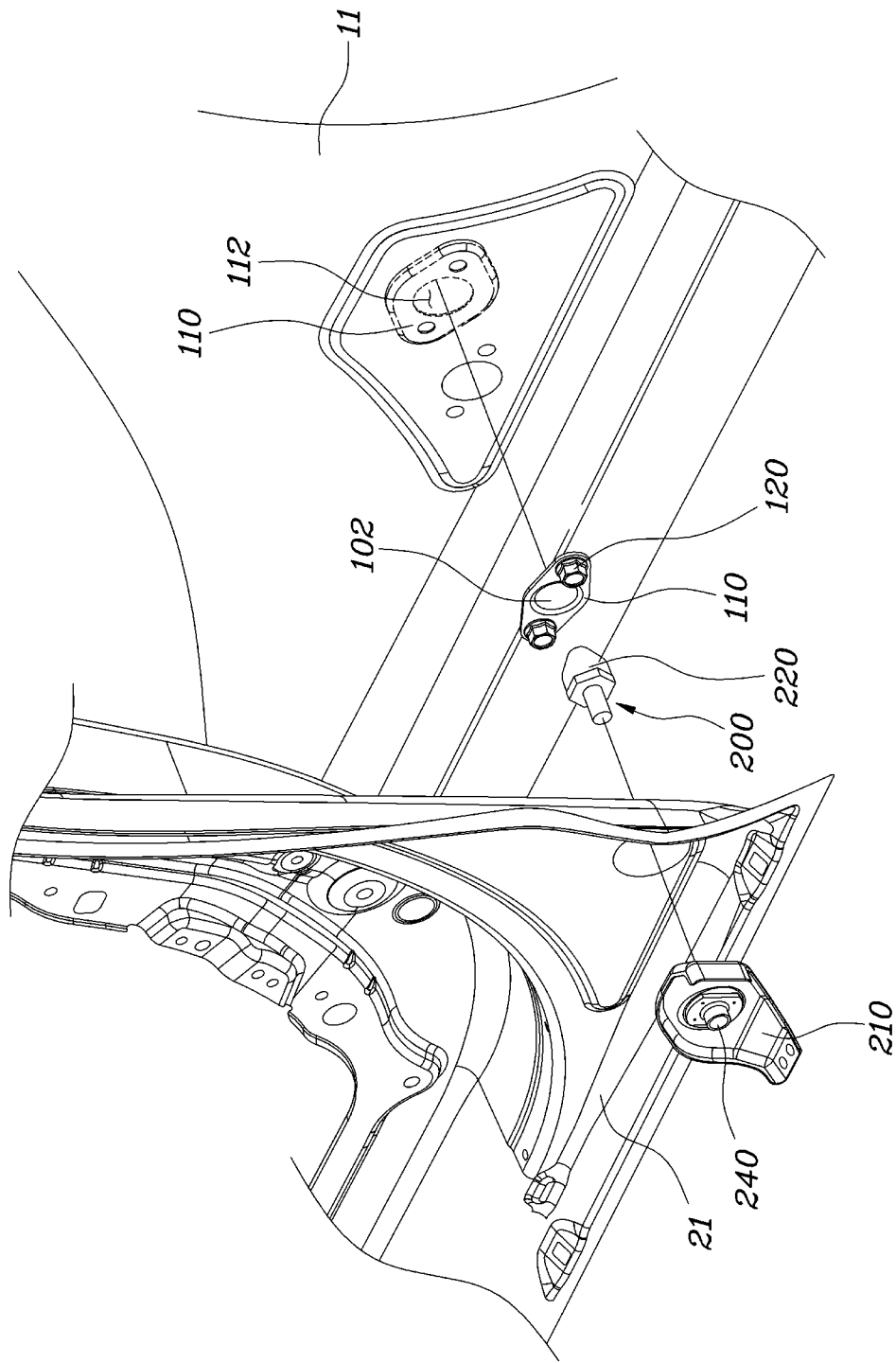
FIG. 3 is an exploded perspective view for describing a mounting relationship between the rigid pin and the pin holder according to embodiments of the disclosure.

Referring to FIG. 3, the pin stiffener 210 is assembled to a back surface of a door inner panel 21 included in the door 20, and the rigid pin 200 is assembled while penetrating through a pin mounting hole 212 formed in the pin stiffener 210 at a front surface of the door inner panel 21. Here, the door inner panel 21 also has a hole, and the rigid pin 200 is assembled while penetrating through the hole of the door inner panel 21.

A structure in which the rigid pin 200 is assembled is described in detail as follows with reference to FIG. 4. The washer 240 is inserted onto a body portion 206 formed at the other end of the rigid pin 200 so as to be interposed between the flange portion 204 at the middle portion of the rigid pin 200 and the front surface of the door inner panel 21. Further, the body portion 206 penetrates through the pin mounting hole 212 and is engaged by a fixing nut 230 at a back surface of the pin stiffener 210.

Here, an outer circumferential surface of the body portion 205 has a bolt shape, such that the fixing nut 230 is bolted to the body portion 205, and engaged while being supported to the back surface of the pin stiffener 210. As a result, mounting and separation of the rigid pin 200 is possible.

Figure 6:
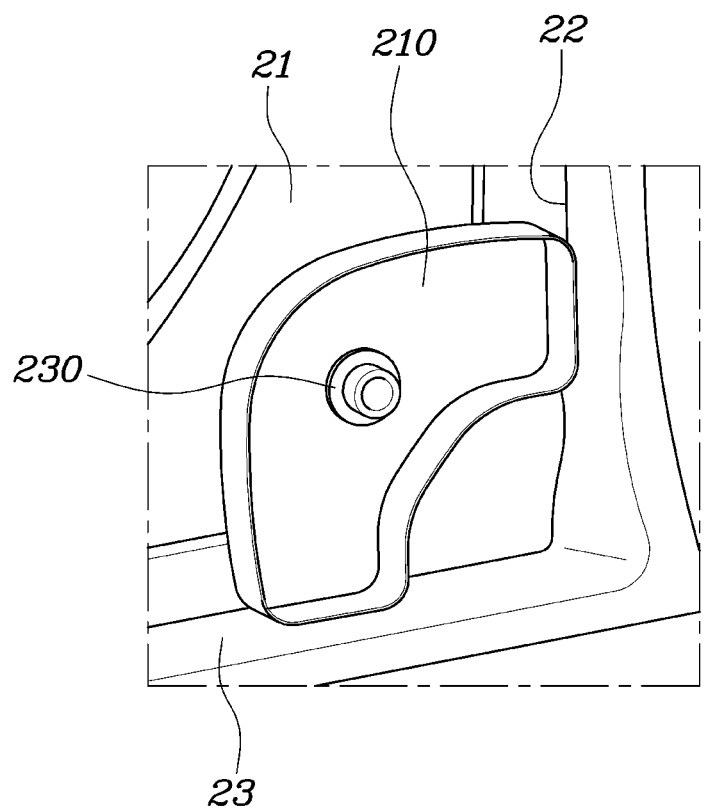
FIGS. 6 to 8 are views illustrating examples of a shape of a pin stiffener according to embodiments of the present disclosure.

Further, FIG. 6 illustrates a first example of a structure of the pin stiffener 210, in which the pin stiffener 210 has an "L"-letter shaped plate shape, and has one surface that is in close surface-contact with the back surface of the door inner panel 21.

Further, one end of the pin stiffener 210 that faces a downward direction is bonded to a lower protruding surface 23 bent backward from the back surface of the door inner panel 21, and the other end of the pin stiffener 210 that faces a lateral direction is bonded to a side protruding surface 22 bent backward from the back surface of the door inner panel 21.

That is, a side end portion and a lower end portion of the pin stiffener 210 are welded to a side portion and a lower portion of the door inner panel 21, respectively, to more stably support the rigid pin 200, thereby improving connection strength between the rigid pin 200 and the pin holder 100.

Figure 7:
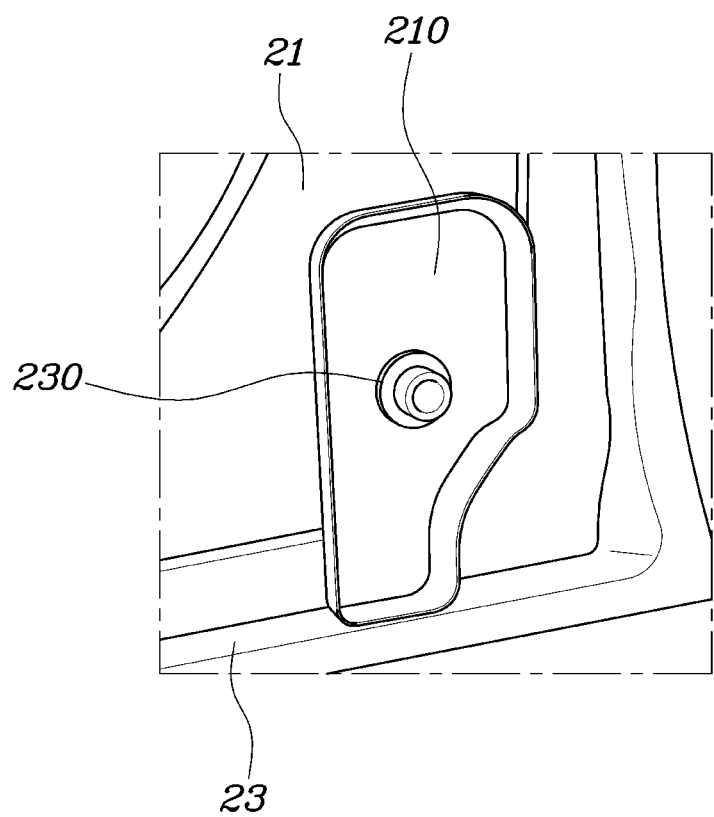

FIG. 7 illustrates a second example of the structure of the pin stiffener 210, in which the pin stiffener 210 has a vertically long plate shape, and has one surface that is in close surface-contact with the back surface of the door inner panel 21.

Further, one end of the pin stiffener 210 that faces a downward direction is bonded to the lower protruding surface 23 bent backward from the back surface of the door inner panel 21.

That is, a lower end portion of the pin stiffener 210 is welded to the lower portion of the door inner panel 21 to more stably support the rigid pin 200, thereby improving connection strength between the rigid pin 200 and the pin holder wo.

Figure 8:
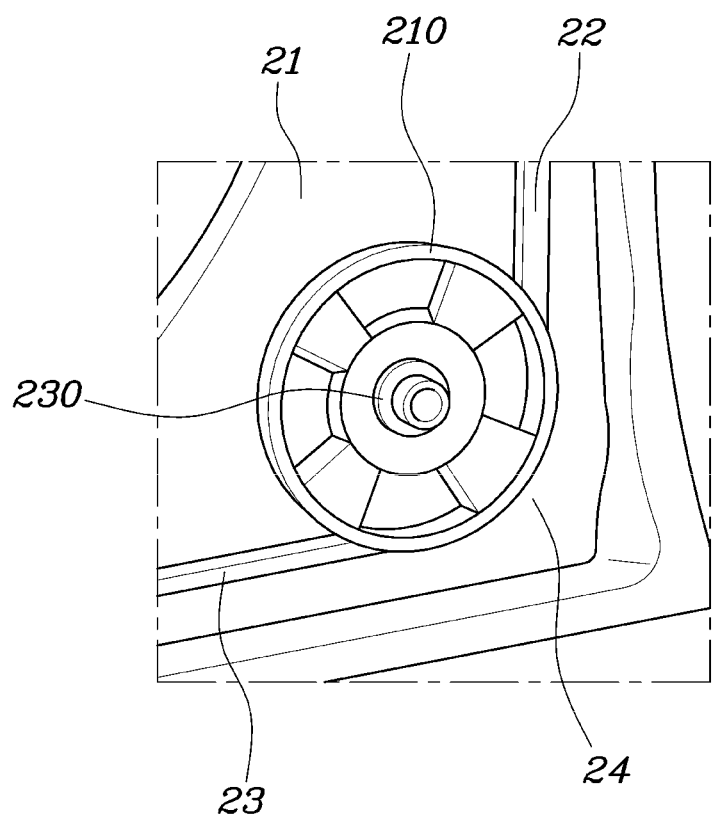

FIG. 8 illustrates a third example of the structure of the pin stiffener 210, in which the pin stiffener 210 has a circular plate shape, and is in close surface-contact with the back surface of the door inner panel 21.

Further, a part of an edge of an outer circumferential surface of the pin stiffener 210 is bonded to a corner protruding surface 24 where the side protruding surface 22 and the lower protruding surface 23 that are bent backward from the back surface of the door inner panel 21 meet each other.

That is, the part of the outer circumferential surface of the pin stiffener 210 is welded to a corner portion where the side portion and the lower portion of the door inner panel 21 meet each other, to more stably support the rigid pin 200, thereby improving connection strength between the rigid pin 200 and the pin holder 100.

However, referring to (F) in FIG. 17, it may be appreciated that the pin stiffener 210 preferably has the "L"-letter shaped structure according to the example illustrated in FIG. 6, which is most advantageous in increasing the torsional rigidity of the vehicle body 10.

In addition, the pin stiffener 210 may have a plate shape having a thickness of 1 mm to 1.4 mm.

Referring to (G) in FIG. 17, it may be appreciated that the thickness of the pin stiffener 210 is preferably 1.0 mm, which is most advantageous in increasing the torsional rigidity of the vehicle body 10.

Meanwhile, the pin holder 100 according to embodiments of the present disclosure may be assembled to a side outer panel 11 by using a holder stiffener 110.

Referring to FIG. 3, the holder stiffener no is assembled to a back surface of a side outer panel 11 included in the vehicle body 10, and the pin holder 100 is assembled while penetrating through a holder mounting hole 112 formed in the holder stiffener 110 at a front surface of the side outer panel 11. Here, the side outer panel 11 also has a hole, and the second fitting portion 102 of the pin holder 100 is assembled while penetrating through the hole of the side outer panel 11.

A structure in which the pin holder 100 is assembled to the side outer panel 11 is described in detail as follows with reference to FIGS. 3 and 4. The second fitting portion 102 into which the rigid pin 200 is fitted is formed at the center of the pin holder 100, and an edge portion surrounding the second fitting portion 102 has a plate shape and is in close surface-contact with the front surface of the side outer panel 11. For reference, the second fitting portion 102 is assembled while penetrating through the holder mounting hole 112 formed in the holder stiffener no and the hole formed in the side outer panel 11.

Further, the pin holder 100 is bolted to the side outer panel 11 and the holder stiffener no by bolting structures 120 at an edge portion of the pin holder 100. Here, an inner diameter of a mounting hole formed in the edge portion of the pin holder 100 may be slightly larger than an outer diameter of a bolt of the bolting structure 120 penetrating through the mounting hole to absorb a tolerance.

That is, as the holder stiffener no is additionally provided on the back surface of the side outer panel 11, the pin holder 100 is bolted not only to the side outer panel 11, but also to the holder stiffener no to increase coupling strength of the pin holder 100, thereby improving connection strength between the rigid pin 200 and the pin holder 100.

Figure 9:
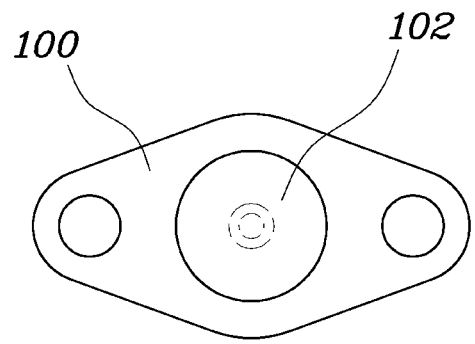
FIGS. 9 to 11 are views illustrating examples of a shape of the pin holder according to embodiments of the present disclosure.

Further, FIG. 9 illustrates a first example of a structure of the pin holder 100, in which the edge portion of the pin holder 100 has a rhombus shape with diagonals having different lengths, and the pin holder 100 is bolted at opposite vertices connected by a diagonal having a longer length.

For example, the pin holder 100 is bolted at opposite ends by the bolting structures 120. That is, mounting of the pin holder 100 is performed at two portions.

Figure 10:
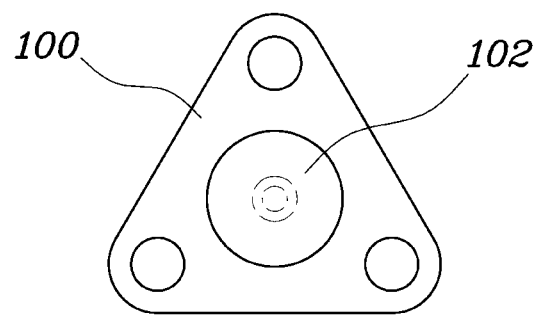

FIG. 10 illustrates a second example of the structure of the pin holder 100, in which the edge portion of the pin holder 100 has a regular triangle shape, and the pin holder 100 is bolted at vertices forming a regular triangle.

For example, the pin holder 100 is bolted at three vertices by the bolting structures 120. That is, mounting of the pin holder 100 is performed at three portions.

Figure 11:
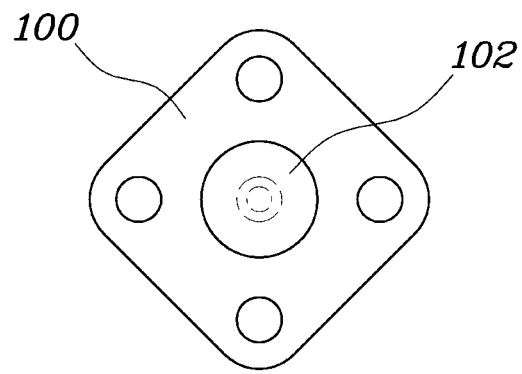

FIG. 11 illustrates a third example of the structure of the pin holder 100, in which the edge portion of the pin holder 100 has a rectangular shape, and the pin holder 100 is bolted at vertices forming a rectangle. Preferably, the edge portion of the pin holder 100 may have a square shape.

Accordingly, the pin holder 100 is bolted at four vertices by the bolting structures 120. That is, mounting of the pin holder 100 is performed at four portions.

Figure 18:
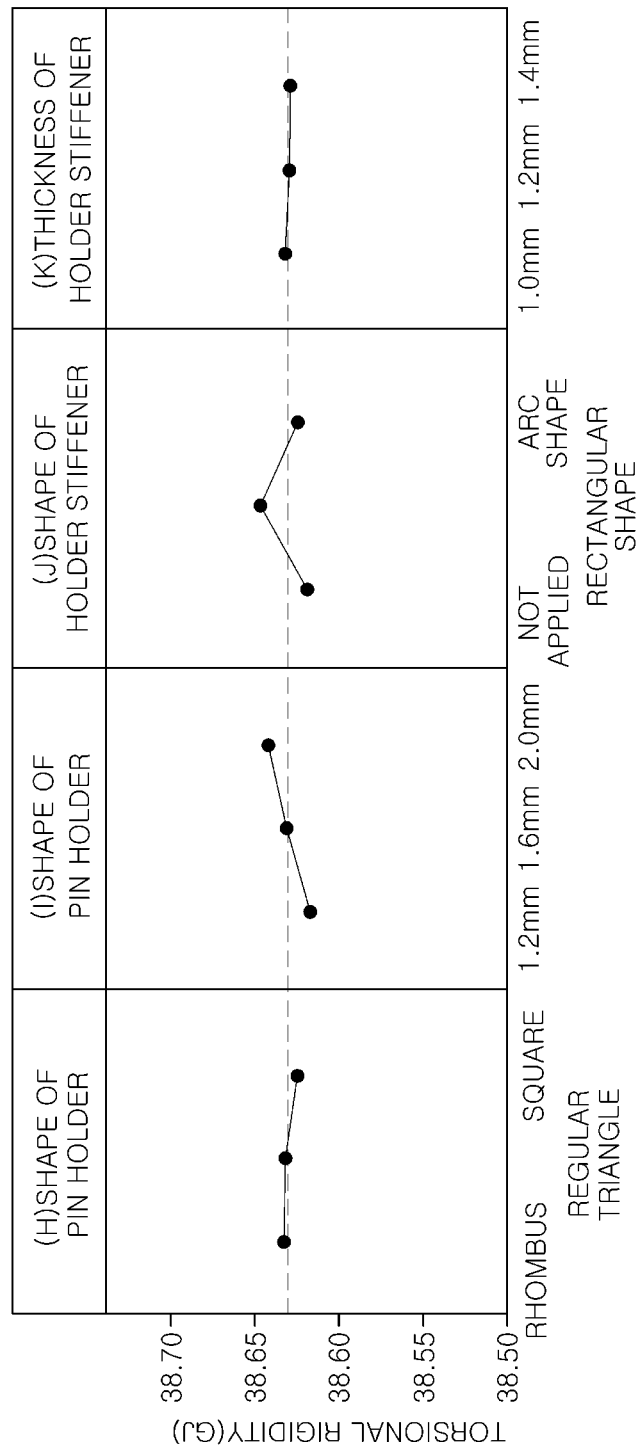

However, referring to (H) in FIG. 18, it may be appreciated that the pin holder 100 preferably has the rhombus-shaped structure according to the example illustrated in FIG. 9, which is most advantageous in increasing the torsional rigidity of the vehicle body 10.

In addition, in a case where the pin holder 100 having the rhombus shape illustrated in FIG. 9 is applied, the pin holder 100 may be coupled in a state in which a longitudinal direction in which a relatively longer diagonal extends is parallel to a front-rear direction of the vehicle body 10 as illustrated in FIG. 3.

However, this is only a preferred example according to embodiments of the present disclosure. As another example, the pin holder boo may be coupled in a state in which the longitudinal direction is inclined at a predetermined angle with respect to the front-rear direction of the vehicle body 10.

Figure 12:
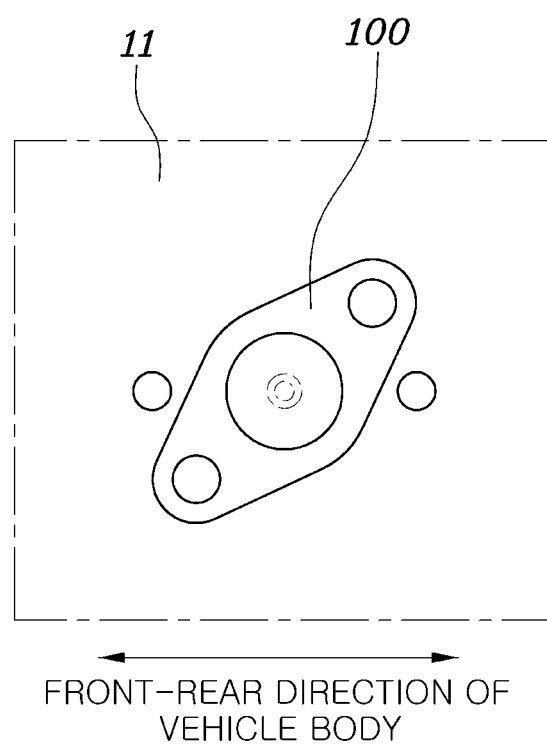
FIGS. 12 and 13 are views illustrating different mounting angles of the pin holder according to embodiments of the present disclosure.
Figure 13:
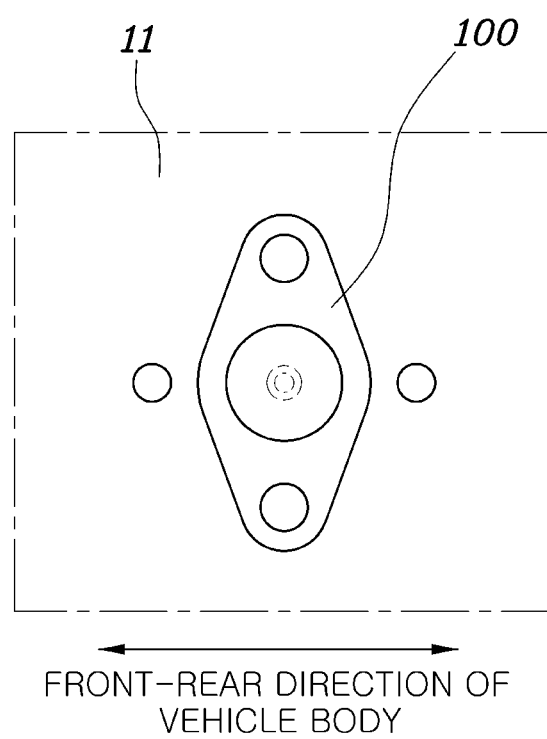

That is, the pin holder 100 may be coupled in a state in which the longitudinal direction is inclined at 45° with respect to the front-rear direction of the vehicle body 10 as illustrated in FIG. 12, or the pin holder 100 may be coupled in a state in which the longitudinal direction is inclined at 90° with respect to the front-rear direction of the vehicle body 10 as illustrated in FIG. 13.

In addition, according to embodiments of the present disclosure, the edge portion of the pin holder 100 may have a plate shape having a thickness of 1.2 mm to 2 mm.

Referring to (I) in FIG. 18, it may be appreciated that the thickness of the pin holder 100 is preferably 2.0 mm, which is most advantageous in increasing the torsional rigidity of the vehicle body 10.

Figure 14:
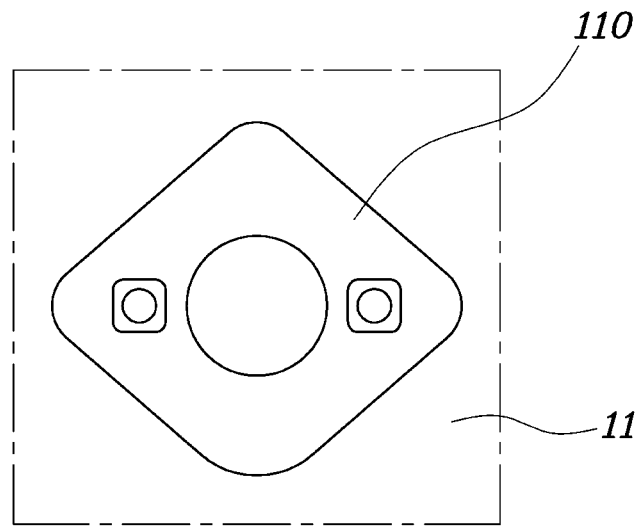
FIGS. 14 to 15 are views illustrating examples of a shape of a holder stiffener according to embodiments of the present disclosure.

Meanwhile, as illustrated in FIG. 14, according to embodiments of the present disclosure, the holder stiffener 110 has a rectangular plate shape, and is in close surface-contact with the back surface of the side outer panel 11.

Further, the holder stiffener 110 is bolted to the side outer panel 11 by the bolting structures 120 at an edge portion of the holder stiffener 110.

For example, in a case where the pin holder 100 having a rhombus shape is applied, the bolting structures 120 may be mounted at two portions in the edge of the rectangular plate.

Figure 15:
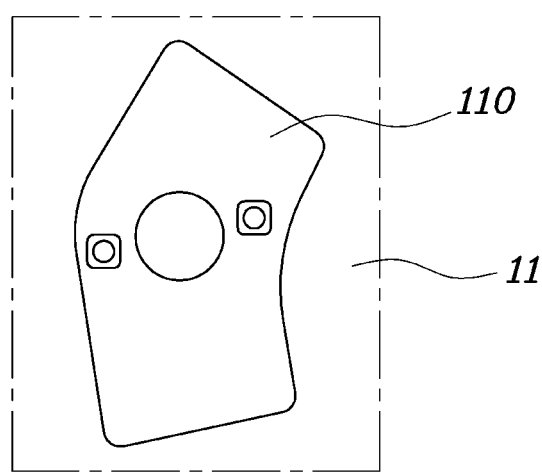

As another example, the holder stiffener 110 may have an arc-shaped plate shape as illustrated in FIG. 15, and in this case, mounting of the holder stiffener 110 may be performed at portions at the edge portion of the holder stiffener 110 as many as the number of bolting structures 120 applied to the pin holder 100.

However, referring to (J) in FIG. 18, it may be appreciated that the holder stiffener 110 preferably has the rectangular structure according to the example illustrated in FIG. 14, which is more advantageous in increasing the torsional rigidity of the vehicle body 10, in comparison to the case of the arc-shaped holder stiffener 110 or a structure without the holder stiffener 110.

In addition, the holder stiffener 110 may have a plate shape having a thickness of 1 mm to 1.4 mm.

Referring to (K) in FIG. 18, it may be appreciated that the thickness of the holder stiffener 110 is preferably 1.0 mm, which is most advantageous in increasing the torsional rigidity of the vehicle body 10.

Figure 16:
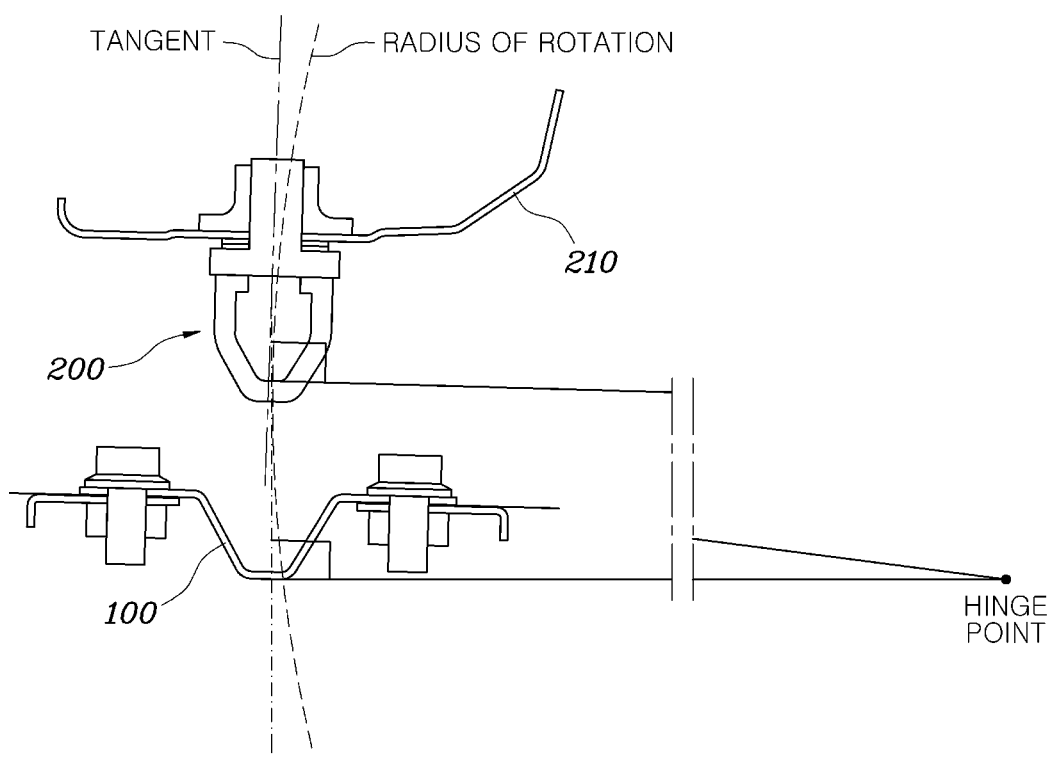
FIG. 16 is a view for describing an assembling direction of the rigid pin according to embodiments of the present disclosure.

Meanwhile, referring to FIG. 16, the axial direction of the rigid pin 200 may be a tangential direction with respect to a radius of rotation of the door 20.

Therefore, when the door 20 is closed, the axial direction of the rigid pin 200 and the center of the groove of the pin holder 100 are in a straight line before the rigid pin 200 is inserted into the pin holder 100, such that the rigid pin 200 may be more stably inserted into the pin holder 100.

As such, according to embodiments of the present disclosure, as the door 20 and the vehicle body 10 are additionally connected by a matching structure between the pin and the holder to reinforce the connection, a risk of deformation of the opening portion for the door 20 during traveling of the vehicle is suppressed, such that rigidity of the vehicle body 10 is enhanced, thereby improving R&H performance.

Further, as generation of vibration of a door panel during traveling of the vehicle is suppressed, road noise is reduced and durability of a hinge and latch structure is improved.

In addition, as support points between the door 20 and the vehicle body 10 are added, side crashworthiness at the time of collision of the vehicle is improved.

Meanwhile, according to embodiments of the present disclosure, positions of the rigid pin 200 and the pin holder 100 may be reversed.

Figure 19:
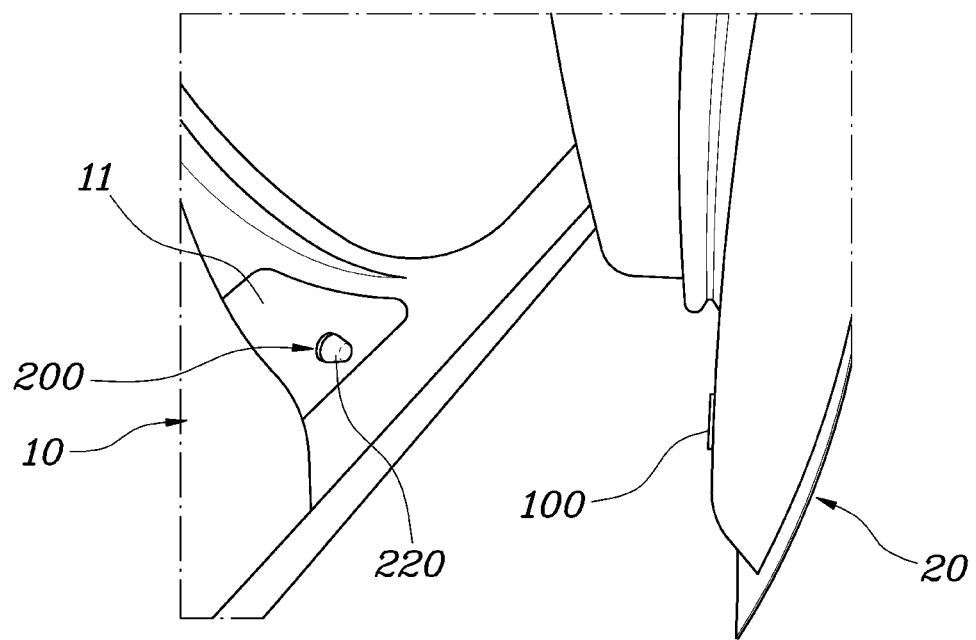
FIG. 19 is a view illustrating a state in which the rigid pin and the pin holder according to embodiments of the present disclosure are mounted on the vehicle body and the door, respectively.

That is, FIG. 19 is a view illustrating a state in which the rigid pin 200 and the pin holder 100 according to embodiments of the present disclosure are mounted on the vehicle body 10 and the door 20, respectively. The rigid pin 200 is mounted on the vehicle body 10, and the pin holder 100 is mounted on the door 20 to reinforce connection between the door 20 and the vehicle body 10.

Referring to FIG. 19, the rigid pin 200 is mounted at the portion of the vehicle body 10 closed with the door 20, that is, at the opening portion for the door 20 so as to face the pin holder 100.

Further, the pin holder boo has a shape corresponding to the rigid pin 200 and is mounted on the door 20, and the rigid pin 200 is press-fitted into the pin holder 100 in a state in which the door 20 is closed to the vehicle body 10.

Accordingly, as the door 20 and the vehicle body 10 are additionally connected to enhance connectivity, a risk of deformation of the opening portion for the door 20 during traveling of the vehicle is suppressed, such that rigidity of the vehicle body 10 is enhanced, thereby improving ride and handling (R&H) performance.

For reference, the rigid pin 200 and the pin holder 100 illustrated in FIG. 19 are different from the rigid pin and the pin holder of FIG. 1 only in regard to the mounting positions, and the shape and coupling structure are substantially the same. Therefore, a detailed description thereof will be omitted.

According to embodiments of the present disclosure, as the door and the vehicle body are additionally connected by a matching structure between the pin and the holder to reinforce the connection, a risk of deformation of the opening portion for the door during traveling of the vehicle is suppressed, such that rigidity of the vehicle body is enhanced, thereby improving R&H performance.

Further, as generation of vibration of a door panel during traveling of the vehicle is suppressed, road noise is reduced and durability of a hinge and latch structure is improved.

In addition, as support points between the door and the vehicle body are added, side crashworthiness at the time of collision of the vehicle is improved.

Meanwhile, although specific examples of embodiments of the present disclosure have been described above in detail, it is obvious to those skilled in the art that various modifications and alterations may be made without departing from the spirit and scope of the present disclosure. In addition, it is obvious that these modifications and alterations are within the following claims.

What is claimed is:

1. A device for enhancing rigidity, the device comprising:
a pin holder configured to be provided at either a door opening of a vehicle body or at a door provided at the door opening;
a rigid pin having a shape corresponding to the pin holder, the rigid pin configured to be provided at the other of the door or the door opening of the vehicle body and configured to be press-fitted into the pin holder when the door is closed at the door opening, wherein a head portion is formed at one end of the rigid pin and protrudes toward the pin holder; and
a buffer member provided at a contact portion between the pin holder and the rigid pin to absorb an impact, the buffer member coupled to the rigid pin and formed to enclose the head portion;
wherein a flange portion is formed at a middle portion of the rigid pin;
wherein a locking groove is formed along a circumferential direction of an outer circumferential surface of a first end of the head portion that is adjacent to the flange portion; and
wherein a locking protrusion having a shape corresponding to the locking groove is formed along a circumferential direction of an inner circumferential surface of a first end of the buffer member, and is coupled to the locking groove.

2. A vehicle comprising:
a vehicle body;
a door attached to the vehicle body;
a pin holder provided at a portion of the vehicle body closed with the door or at the door; and
a rigid pin having a shape corresponding to the pin holder, the rigid pin being provided at the other of the door or the portion of the vehicle body closed with the door and being press-fitted into the pin holder when the door is closed to the vehicle body, wherein a head portion formed at one end of the rigid pin protrudes toward the pin holder;
a buffer member provided at a contact portion between the pin holder and the rigid pin to absorb an impact, the buffer member being coupled to the rigid pin and formed to enclose the head portion;
wherein a flange portion is formed at a middle portion of the rigid pin;
wherein a locking groove is formed along a circumferential direction of an outer circumferential surface of a first end of the head portion that is adjacent to the flange portion; and
wherein a locking protrusion having a shape corresponding to the locking groove is formed along a circumferential direction of an inner circumferential surface of a first end of the buffer member, and is coupled to the locking groove.

3. The vehicle of claim 2, wherein the pin holder is mounted at one or more of a lower portion of a center pillar of the vehicle body, a middle portion of a front pillar of the vehicle body, or an upper portion of the center pillar.

4. The vehicle of claim 2, wherein:
a first fitting portion having a cone shape is formed at a second end of the buffer member;
a second fitting portion having a groove shape corresponding to the first fitting portion is formed at a middle portion of the pin holder; and
an angle of a side surface of the first fitting portion is 25° to 35° with respect to an axis of the rigid pin.

5. The vehicle of claim 4, wherein a maximum outer diameter of the buffer member is 20 mm to 24 mm around the axis of the rigid pin.

6. The vehicle of claim 4, wherein:
a second end of the head portion of the rigid pin has a shape corresponding to the cone shape of the first fitting portion; and
a thickness of the side surface of the first fitting portion is 3 mm to 5 mm.

7. The vehicle of claim 4, wherein the buffer member is formed of a thermoplastic elastomer (TPE) having a hardness of 70 Hs to 80 Hs.

8. The vehicle of claim 4, wherein a position of the buffer member in an axial direction is adjustable so that a pressed length of the side surface of the first fitting portion that is pressed against an inner wall surface of the groove shape of the second fitting portion in a state in which the buffer member is fitted into the pin holder is 0.5 mm to 1.5 mm.

9. The vehicle of claim 4, wherein a gap having a predetermined size is formed between a distal end of the first fitting portion and an inner distal end of the second fitting portion that faces the distal end of the first fitting portion, in a state in which the buffer member is fitted into the pin holder.

10. The vehicle of claim 2, wherein:
a pin stiffener is assembled to a back surface of a door inner panel included in the door;
the rigid pin is assembled while penetrating through a pin mounting hole formed in the pin stiffener at a front surface of the door inner panel;

a washer is inserted onto a body portion formed at an end of the rigid pin so as to be interposed between a flange portion formed at a middle portion of the rigid pin and the front surface of the door inner panel; and the body portion penetrates through the pin mounting hole and is engaged by a fixing nut at a back surface of the pin stiffener.

11. The vehicle of claim 10, wherein:

the pin stiffener has a plate shape and is in close surface-contact with the back surface of the door inner panel;

a first end of the pin stiffener is bonded to a lower protruding surface formed at the back surface of the door inner panel;

a second end of the pin stiffener is bonded to a side protruding surface formed at the back surface of the door inner panel; and the pin stiffener has a plate shape having a thickness of 1 mm to 1.4 mm.

12. The vehicle of claim 10, wherein:

the pin stiffener has a circular plate shape and is in close surface-contact with the back surface of the door inner panel;

a part of an edge of the pin stiffener is bonded to a corner protruding surface where a side protruding surface and a lower protruding surface meet each other at the back surface of the door inner panel; and the pin stiffener has a plate shape having a thickness of 1 mm to 1.4 mm.

13. The vehicle of claim 2, wherein an axial direction of the rigid pin is a tangential direction with respect to a radius of rotation of the door.

14. A vehicle comprising:

a vehicle body;

a door attached to the vehicle body;

a pin holder provided at a portion of the vehicle body closed with the door;

a rigid pin having a shape corresponding to the pin holder, the rigid pin being provided at the door and being press-fitted into the pin holder when the door is closed to the vehicle body;

a holder stiffener assembled to a back surface of a side outer panel included in the vehicle body; and a buffer member provided at a contact portion between the pin holder and the rigid pin to absorb an impact;

wherein the pin holder is assembled while penetrating through a holder mounting hole formed in the holder stiffener at a front surface of the side outer panel;

wherein a second fitting portion into which the rigid pin is fitted is formed at a center of the pin holder;

wherein an edge portion surrounding the second fitting portion has a plate shape and is in close surface-contact with the front surface of the side outer panel;

wherein the pin holder is bolted to the side outer panel and the holder stiffener by bolting structures at the edge portion of the pin holder, wherein a head portion formed at one end of the rigid pin protrudes toward the pin holder; and wherein the buffer member is formed to enclose the head portion and is coupled to the rigid pin;

wherein a flange portion is formed at a middle portion of the rigid pin;

wherein a locking groove is formed along a circumferential direction of an outer circumferential surface of a first end of the head portion that is adjacent to the flange portion; and wherein a locking protrusion having a shape corresponding to the locking groove is formed along a circumferential direction of an inner circumferential surface of a first end of the buffer member and is coupled to the locking groove.

15. The vehicle of claim 14, wherein:

the edge portion of the pin holder has a rhombus shape with diagonals having different lengths and the pin holder is bolted at opposite vertices connected by a diagonal having a longer length; and the edge portion of the pin holder has a plate shape having a thickness of 1.2 mm to 2 mm.

16. The vehicle of claim 14, wherein:

the edge portion of the pin holder has a regular triangle shape or a square shape and the pin holder is bolted at each vertex; and the edge portion of the pin holder has a plate shape having a thickness of 1.2 mm to 2 mm.

17. The vehicle of claim 14, wherein:

the holder stiffener has a rectangular plate shape and is in close surface-contact with the back surface of the side outer panel;

the holder stiffener is bolted to the side outer panel by the bolting structures at an edge portion of the holder stiffener; and the holder stiffener has a plate shape having a thickness of 1 mm to 1.4 mm.

18. The vehicle of claim 2, wherein the pin holder is mounted at a lower portion of a center pillar of the vehicle body.

19. The vehicle of claim 2, wherein the pin holder is mounted at a middle portion of a front pillar of the vehicle body.

20. The vehicle of claim 2, wherein the pin holder is mounted an upper portion of a center pillar of the vehicle body.

* * * * *